United States Patent [19]

Herault

[11] 4,177,313

[45] Dec. 4, 1979

[54] AMINE-MODIFIED LIGNOSULFONATE-EXTENDED PHENOL FORMALDEHYDE RESINS

[75] Inventor: Pierre C. Herault, Decatur, Ga.

[73] Assignee: Georgia-Pacific Corporation, Portland, Oreg.

[21] Appl. No.: 964,291

[22] Filed: Nov. 28, 1978

[51] Int. Cl.² .................. C08L 97/00; C08H 5/02
[52] U.S. Cl. .................. 428/288; 156/62.2; 156/296; 156/335; 264/128
[58] Field of Search .............. 260/17.5; 428/288; 156/62.2, 335, 296; 264/128

[56] References Cited

U.S. PATENT DOCUMENTS

| | | | |
|---|---|---|---|
| 2,228,567 | 1/1941 | John | 260/72 |
| 2,709,696 | 5/1955 | Wiest et al. | 260/124 |
| 2,849,314 | 8/1958 | Goss | 92/3 |
| 3,079,353 | 2/1963 | Goss | 260/17.5 |
| 3,141,873 | 7/1964 | Goss | 260/124 |
| 3,234,154 | 2/1966 | Martin | 260/17.5 |
| 3,285,801 | 11/1966 | Sarjeant | 161/170 |
| 3,455,895 | 7/1969 | Niilo-Rama et al. | 260/124 |
| 3,463,747 | 8/1969 | Noll et al. | 260/17.5 |
| 3,597,375 | 8/1971 | Ludwig et al. | 260/17.5 |
| 3,697,497 | 10/1972 | Falkehag | 260/124 |
| 3,784,493 | 1/1974 | Giguere et al. | 260/17.5 |
| 3,790,441 | 2/1974 | Ashall | 161/198 |
| 3,790,442 | 2/1974 | Ashall | 161/198 |
| 3,931,072 | 1/1976 | Coyle | 260/17.5 |
| 3,940,352 | 2/1976 | Wennerblom et al. | 260/17.5 |
| 3,991,022 | 11/1976 | Dimitri | 260/17.5 |
| 4,127,554 | 11/1978 | Allan | 260/17.5 |

FOREIGN PATENT DOCUMENTS 901106 7/1962 United Kingdom .
1293744 10/1972 United Kingdom .
1316911 5/1973 United Kingdom .

Primary Examiner—Earl A. Nielsen

[57] ABSTRACT

An amine-modified lignosulfonate is formed from a water-soluble basic amine and a water-soluble lignosulfonate salt. The amine-modified lignosulfonate is incorporated into a phenol-formaldehyde resole resin to provide a binder particularly suitable for mineral fiber insulation mats.

15 Claims, No Drawings

AMINE-MODIFIED LIGNOSULFONATE-EXTENDED PHENOL FORMALDEHYDE RESINS

This invention relates to an amine-modified lignosulfonate and its incorporation into a phenol-formaldehyde binder composition useful, inter alia, in the manufacture of mineral fiber mats.

Mineral fiber mats are made by passing the mineral in molten form through a fiber forming device, e.g., multiple orifice plate or spinnerette, and spraying an aqueous thermosetting binder resin onto the fibers while they are at an elevated temperature. The binder spray deposits a thin coating of resin on the fibrous surfaces. The resin-coated fibers may then be laid down in a random fashion on a travelling grate or conveyor and passed through an oven where the resin is cured and the individual fibers are bonded together to form a mat. Among the materials which are formed into mats by this basic process or variants thereof are silica, magnesia, alumina, soda, lime, slag and the like. Products of this nature are referred to in the art as glass wool, rock wool, slag wool and the like.

The aqueous binder system which has found widespread application for mineral fiber mats is based on a phenol-formaldehyde resin. In the prior art various extenders and modifiers have been added to the phenolic binder systems to reduce their cost or improve their properties. One widely used type of extender in phenolic systems comprises lignosulfonate salts. See, e.g., U.S. Pat. Nos. 3,227,667; 3,285,801; 3,790,441; 3,790,442; 3,597,375 and 3,940,352. However, the use of unmodified lignosulfonate salts as extenders for phenolic resins has resulted in an undesirable precure problem in the insulation industry. Precure results when the binder resins cures upon hitting the hot mineral fibers rather than in the curing oven. Premature curing of the resin results in greatly reduced bonding of the mineral fibers and a mat with little or no structural strength.

Attempts to overcome the precure problem by adding nitrogen-bearing compounds such as urea, melamine and dicyandiamide formaldehyde resins to the phenolic lignosulfonate binder have been successful, but the use of these nitrogen-bearing compounds has caused moisture related problems in the finished products. A need exists for an economical extender that effectively overcomes precure problems and, at the same time, allows higher levels of extention with improved efficiency.

It is an object of the present invention to provide an amine-modified lignosulfonate which imparts desirable properties when incorporated into a phenol-formaldehyde binder system.

It is a further object of the present invention to provide a phenol-formaldehyde binder system which has cure characteristics similar to unextended phenolic insulation resins.

It is also an object of the present invention to provide a phenol-formaldehyde binder system which has a binder efficiency better than that of unextended phenolic insulating resins and at least equal to the efficiencies of unmodified lignosulfonate extended phenol-formaldehyde systems.

It is another object of the present invention to provide a phenol-formaldehyde binder system which has tensile strength equivalent to standard lignosulfonate extended phenol-formaldehyde binder systems but which has higher levels of extension than the standard systems.

It is also an object of the present invention to provide a phenol-formaldehyde binder system having good tensile strength retention when exposed to moist atmosphere.

In accordance with these and other objectives the present invention provides an amine-modified lignosulfonate containing from about 2% to about 12% by weight of a water-soluble basic amine and from about 88 to about 98% by weight of a water-soluble lignosulfonate salt. The amine-modified lignosulfonate is incorporated into a phenol-formaldehyde resin to provide a resin binder composition comprising an aqueous solution of a phenol-formaldehyde resole resin and from about 40 to about 100% by weight based on phenol-formaldehyde resin solids of a water-soluble basic amine-modified lignosulfonate.

The present invention also contemplates the use of the amine-modified lignosulfonate extender and phenol-formaldehyde resin in the method of producing mineral fiber mats useful for insulation purposes. More particularly, in the method of producing mineral fiber mats useful for insulation purposes wherein mineral fibers are formed, the fibers are contacted with a thermosettable phenol-formaldehyde resin binder, the resin coated fibers are formed into a mat and the resin binder is cured with heat, the present invention contemplates the improvement wherein the resin binder is an aqueous solution of a phenol-formaldehyde resole resin and from about 40 to about 100% by weight based on phenol-formaldehyde resin solids of a water-soluble basic amine-modified lignosulfonate said modified lignosulfonate containing from about 2% to about 12% by weight of a water-soluble basic amine and from about 88 to about 98% by weight of a water-soluble lignosulfonate salt. In addition, this invention embraces the mineral mat, so formed.

It has been found that when an amine is blended with a water-soluble salt of lignosulfonic acid, the resulting amine-modified lignosulfonate provides desirable and advantageous properties. Liquid chromatographic analysis of unmodified lignosulfonate when compared to amine-modified lignosulfonate shows a definite change in molecular weight distribution. When an amine is blended into lignosulfonate some of the smaller molecular weight groups appear to be shifted toward higher molecular weight chains.

In the preparation of the amine-modified lignosulfonate extenders useful in the practice of this invention, a water-soluble lignosulfonate salt is employed. Calcium, ammonium, sodium, or magnesium lignosulfonates, for example, can be employed, with ammonium and calcium lignosulfonates constituting preferred lignosulfonate salts. Lignosulfonates are well known in the art and are commonly obtained as by-products in the digestion of wood pulp. Lignosulfonates are readily available commercially. A 50% solution of lignosulfonates is acidic and generally will exhibit a pH of from about 4 to about 6.

The second component to be used in preparing the extender employed in this invention is a water-soluble amine. Water-soluble, basic, primary, secondary, or tertiary amines which contain aliphatic, cyclic or aromatic groups are satisfactory for use in the practice of this invention. Primary and tertiary amines are preferred. Indeed, mixtures of amines may be employed, as may amines which have more of one type of amine group. For example, alkylene amines (polyalkyl polyamines) which have both primary and secondary amine groups can be used. Alkylene and alkanol amines have been found to be exceptionally well suited for this invention and are preferred. Representative amines include, inter alia, methylamine, ethylamine, monoethanol amine, diethanol amine, triethanol amine, isopropanol amine, propylene diamine, diethylenetriamine and aniline. Because the cost of an extender is an important consideration, still bottoms from the production of amines constitute a cost effective source of the amine component. Such still bottoms include, for example, the bottoms from the production of alkanol amines such as triethanol amine or isopropanol amine; alkylamines; or morpholine.

The amines are used in the range of from about 2 to about 12%, but preferably from about 4 to about 10% while the lignosulfonate salt is employed in the range of from about 88 to 98%, and preferably from about 90 to about 96% by weight. Such %'s by weight are based on the combined weights of the lignosulfonate and amine components. The amine-modified lignosulfonate contains both the amine and the lignosulfonate salt.

The amine-modified lignosulfonates useful in the present invention generally are readily formed by blending the amine and lignosulfonate salt together with thorough mixing of an aqueous medium at ambient temperatures. Temperatures somewhat above ambient temperature, however, can be employed if desired, for example, temperatures up to the boiling point of $H_2O$ could be used. In practice, the amine constituent is added slowly to the lignosulfonate salt with constant agitation until the final pH of the mixture reaches at least about 7 and preferably at least about 7.5. Amine-modified lignosulfonates (as a 50% solution) have a pH of at least about 7 and preferably at least about 7.5.

The amine-modified lignosulfonate-extended phenol-formaldehyde binder system of the present invention is made by blending a standard phenol-formaldehyde resin with the extender. The phenolic resins useful in the practice of this invention are well known in the art and generally comprise water-soluble, alkaline-catalyzed resole phenol-formaldehyde resins. Typically, such a resin may comprise a mixture of methyol phenols and polycondensate products. Generally, the extender is added in amounts ranging from about 40% to about 100% by weight (solids) based on the phenol-formaldehyde.

Solids concentrations of the extender and of the phenolic resin solutions are not critical. Lignosulfonates are generally available in solutions of approximately 50% solids and the amine-modified extender solution often will be a solution containing about 40 to about 60% solids. Somewhat similarly, phenol-formaldehyde resole resins are often available in about 40 to about 65% solids solutions. When the amine-modified lignosulfonate and phenol resin are combined and used in the formation of mineral fiber mats, the solutions often are diluted to provide from about 4 to about 25% solids content. Dilute solutions are employed in order to obtain increased fiber cooling due to the additional water present. Industry standards require that the binder (as a 50% solids solution) be capable of 2,000% dilution (20:1 by volume) without precipitating solids, and that standard is readily met by the binder of this invention.

Particularly preferred binders for mineral fiber mats include urea in addition to the amine-modified lignosulfonate extender and phenol-formaldehyde resin. The urea functions as a formaldehyde scavenger and as an anti-punking agent (it tends to suppress the smoldering of paper or the like which may be attached to or in contact with the newly formed hot mineral fiber mat). Desirably, the urea is present in amounts of from about 1 to about 15% by weight based on the total weight of extender and phenolic solids.

The resin binder system may be applied to mineral fibers in a conventional manner, for example, by spraying. For low density insulation mats the binder solids may comprise from about ½ to about 2½ percent by weight based on the mineral fiber. Higher density mats may contain up to 15 to 20 percent binder solids by weight.

The use of amine-modified lignosulfonates extenders in conjunction with phenol-formaldehyde resins according to this invention results in: (1) binders whose cure characteristics are similar to unextended phenolic insulation resins; (2) binder efficiencies better than those of unextended phenolic resins and at least equal to the efficiencies of unmodified lignosulfonate extended phenolic binder systems; (3) tensile strengths equivalent to standard lignosulfonate extended phenolic binders; (4) utilization of higher levels of extender while maintaining the required tensile strengths; and (5) improvements in tensile strength retention when exposed to a moist atmosphere. In addition to its utility as a binder for mineral fiber mats, the extended binder of this invention is useful as a laminating resin, inter alia, for wood or paper laminates, as a buinder for foundry sand, and as an adhesive. Obviously, other minor components normally employed in the binder art can also be present.

The following examples are included for illustrative purposes and are not intended to limit the scope of the invention.

EXAMPLE 1

A mixing vessel equipped with an agitator was charged with 93 parts of a 50% solids calcium lignosulfonate aqueous solution. To this, 7 parts of triethanolamine was slowly added with constant agitation. This mixture was agitated for an additional 30 minutes and then sampled to determine pH. Additional amine was added as necessary to raise the pH above 7.5. The material was then discharged through a 100 mesh screen. The properties of the resultant modified lignosulfonate solution are as follows:
pH: 7.7
Specific gravity: 1.251
Water dilutability: Infinite
Solid Content: 54.4%

EXAMPLE 2

To a mixing vessel equipped with an agitator and a means of raising the temperature, 46.5 parts of water is added. The water is heated to 100°–130° F., then 46.5 parts of a powdered ammonium lignosulfonate (Orzan G, ATM of Crown Zellerbach) is slowly added with continuous agitation. The mixing is continued until a complete solution is obtained. To the lignosulfonate solution, 7 parts of triethanolamine was added while continuing to agitate the solution. After 30 minutes the pH of the mixture was determined and additional amine was added—as necessary—to raise the pH above 7.5. The modified ammonium lignosulfonate was discharged through a 100 mesh screen. The physical properties were as follows:
Viscosity: 104 cps.

pH: 8.3
Specific Gravity: 1.233
Water Dilutability: Infinite
Solid Content: 53.4%

EXAMPLE 3

To a suitably equipped mixing vessel, 952.4 grams of a sodium lignosulfonate solution (E-3348, a product of Georgia-Pacific Corporation) was added. With continuous agitation 47.6 grams of triethanolamine was added. Agitation was continued an additional 30 minutes, after which the pH was adjusted above 7.5 as necessary. The resultant solution was discharged through 100 mesh screens. The physical properties of the modified sodium lignosulfonate solution was as follows:

pH: 9.8
Water Dilutability: Infinite
Solids Content: 48.3%
Specific Gravity: 1.229

EXAMPLE 4

To 97.6 parts of a 50% ammonium lignosulfonate solution, 2.4 parts of triethylenetetramine was slowly added with continuous agitation. After agitating for 30 minutes the solution was sampled and the pH was determined to be above 7.5. The material was filtered through a 100 mesh screen. The physical properties of this modified ammonium lignosulfonate solution were as follows:

pH: 9.0
Water Dilulability: Infinite
Solids Content: 50.9

EXAMPLE 5

Example 5 was repeated, but the amine used in this preparation was diethylamine. The physical properties of this modified ammonium lignosulfonate was as follows:

pH: 8.9
Water Dilutability: Infinite
Solid Content: 54.1%

EXAMPLE 6

To a vessel with agitator, 7 parts of ammonia was added to 93 parts of a 50% solids ammonium lignosulfonate solution. This mixture was thoroughly mixed to obtain a homogenous solution. The properties of this material were as follows:

pH: 9.2
Water Dilutability: Infinite
Viscosity: 27 cps.
Solid Content: 48.1%

EXAMPLE 7

A 60/30/10 (phenolic resin solids/lignosulfonate solids/urea solids) binder mix was selected as the standard. This binder was applied to glass microbeads at 25% binder solids (i.e., phenolic+urea+lignosulfonate solids). A general formula for a 60/30/10 binder is as follows:

Phenolic Insulation Resin[1]: 27.8%
Urea: 2.5%
Ammonium hydroxide (29%): 3.0%
Ammonium sulfate: 0.3%
Coupling Agent[2]: 0.03%
Lignosulfonate extender: 15.0%
Water: 51.37%

[1]GP-2881, product of the Georgia-Pacific Corporation
[2]Silane A1102, product of the Union Carbide Corporation To control the binding solids, the amount of resin, extender, and water will vary from mix to mix. Wherever practical, additional binder formulations such as 50/40/10 and 45/45/10 were evaluated in a like manner. A large number of specimens were prepared for each binder evaluation, but only average values are shown. The value "Percent Dry Strength Retained (%DSR)" was obtained by:

$$\% \, DSR = \frac{\text{Wet Strength, psi}}{\text{Dry Strength, psi}} \times 100$$

Tensile strengths were obtained according to the following procedure:

1. Weigh out 1000 gm of glass shot into the ½ gal. stainless beaker.
2. Mix the 40 gm of binder in a separate beaker.
3. Hold the beaker of glass shot firmly, start mixing the glass shot with the Jiffy Mixer driven by ¼" variable speed drill. While mixing, pour the binder solution into the glass shot over a period of ½ minute.
4. Continue mixing for 2 minutes (make sure binder is evenly mixed throughout the glass shot).
5. Fill the Dog Bone Mold cavities with the shot/binder mixture, then tamp firmly with the flat side of 16 gu. sheet metal to assure all voids are filled. Remove sheet metal and use the stainless steel scraper to remove excess shot/binder. Make sure sample surfaces are smooth and even. Place flat sheet metal on top of the mold, turn mold upside down, then separate and remove cavity mold.
6. Use the paint brush to remove any glass/binder mixture that may stick to the mold. This should be done before making the next set of samples.
7. After 12 samples of a formulation have beenf made, place the briquets, while on the metal sheets, into the curing oven at 400° F. (204.8° C.) for 20 minutes, at the end of 20 minutes, remove the samples and allow to cool on the metal sheets.
8. When the samples have cooled, check sample weights to determine the average weight. Discard any sample that is 2 gm more or less than the average.

Testing

Set Instron crosshead speed at 0.1 in./min. with the special dog bone jaws, use "D" cell set at 200 lbs. load. Place one sample at a time in the dog bone jaws and record maximum tensile load in pounds. For moisture resistance, place samples in:

1. Water bath of 72° F. distilled water for 15 minutes of,
2. Humidity cabinet for 24 hours at 155° F. (65°-7° C.), 95% RH Remove samples from water or cabinet and test while wet. The results are shown in Table I.

TABLE I
TENSILE STRENGTH TEST

| Extender | Binder Formulation (Solids) (P/F Resin/Lignosulfonate/Urea) | Tensile Strength (psi) | | | Remarks |
|---|---|---|---|---|---|
| | | Dry | Wet | % Dry Retained | |
| Commercial | 60/30/10 | 252 | 189 | 75.0 | — |
| Ammonium Lignosulfonate | 50/40/10 | 224 | 135 | 60.3 | — |
| | 45/45/10 | 183 | 103 | 56.3 | — |
| Modified | 60/30/10 | 288 | 226 | 78.5 | Example 2 |
| Ammonium Lignosulfonate | 50/40/10 | 264 | 193 | 73.1 | Example 2 |
| | 45/45/10 | 239 | 170 | 71.1 | Example 2 |
| Commercial Calcium Lignosulfonate | 60/30/10 | 338 | 273 | 80.8 | — |
| Modified Calcium Lignosulfonate | 6/30/10 | 328 | 294 | 89.6 | Example 1 |
| Commercial Sodium Lignosulfonate | 6/30/10 | 186 | 136 | 73.1 | — |
| Modified Sodium Lignosulfonate | 6/30/10 | 217 | 175 | 80.7 | Example 3 |
| Modified | 6/30/10 | 294 | 233 | 79.3 | Example 4 |
| Ammonium Lignosulfonate | 6/30/10 | 209 | none | — | Example 7 |

The data as presented in Table I demonstrates the following trends:

1. Substitution of the modified lignosulfonate solutions increases the tensile strength of all binder formulations, when compared to commercially available lignosulfonate solutions;
2. Substitution of the modified lignosulfonate solutions improves the dry strength retention in all binder formulations; whereas, the commercial unmodified lignosulfonates do not;
3. Some salts of lignosulfonate perform somewhat better than other salts of lignosulfonate and the same is true of salts of modified lignosulfonate.

EXAMPLE 8

The following procedure was used to demonstrate the precure retarding effect of the extender of this invention.

(a) To avoid variations due to the amount of water in the resins, adjust resin solids content to 45%

(b) Place 10 drops of resin on the center of the cure plate and spread with the needle to the size of a quarter. When the 10 drops are on the plate, start the timer.

(c) Record elapsed time to first end point. This end point is called "A" stage or Water Removal. This end point is reached when the bubble of vapor stop coming off the resin.

(d) Continue recording the elapsed time to the second end point. Check the resin every 10-15 seconds. The second end point is called the start of thermoplasticity or first stage of thermoplasticity. This stage is reached when the first slight thread is formed from the outer edges of the circle of resin when it is teased with the point of the needle.

(e) Continue recording the elapsed time until the third end point is reached. This end point is called the end of thermoplasticity. It is determined as the point when the resin no longer flows when teased (i.e., when teased with the needle to a ball, the resin will no longer melt down).

(f) Continue recording the elapsed time to the last end point. This is "C" stage or complete, or final cure. It is described as the point when the resin passes the rubbery stage and chips off the plate rather than lifts off.

(g) Tests are run in duplicate and results averaged. The results are shown in Table II.

TABLE II

| | | | STAGE OF CURE DATE | | | |
|---|---|---|---|---|---|---|
| Example | % Resin | % Extender | 1st Stage[1] (sec.) | 2nd Stage[2] (sec.) | C Stage[3] (sec.) | Remarks |
| — | 100 | 0 | 162 | 299 | 350 | Standard Insulation Resin |
| — | 60 | 40 | 64 | 153 | 198 | Commercial Ammonium Lignosulfonate Solution |
| — | 50 | 50 | 54 | 133 | 170 | Commercial Sodium Lignosulfonate Solution |
| — | 50 | 50 | 61 | 205 | 247 | Commercial Calcium Lignosulfonate Solution |
| 2 | 60 | 40 | 93 | 260 | 311 | — |
| | 50 | 50 | 82 | 255 | 300 | — |
| | 40 | 60 | 71 | 225 | 277 | — |
| | 30 | 70 | 51 | 184 | 217 | — |
| 1 | 50 | 50 | 66 | 221 | 267 | — |
| 3 | 50 | 50 | 57 | 141 | 180 | — |
| 5 | 60 | 40 | 63 | 127 | 254 | — |
| 6 | 60 | 40 | 50 | 118 | 195 | — |

[1] See GPAM 207.2 Step 3 (d)
[2] GPAM 207.2 Step 3 (e)
[3] See GPA, 207.2 Step 3 (f)

For this test a standard phenolic insulation resin was used. The exhibited data represents results obtained from neat resin, resin extended with commercial lignosulfonates, and resin extended with modified lignosulfonates. Since the "A-Stage" of the Stage of Cure test was difficult to determine and of little or no real value, it was not recorded in this study.

From the data shown in Table II it can be seen that when any commercial salt of lignosulfonic acid is used to extend a standard phenolic insulation resin, the various stages of cure are shortened. The addition of the salts of amine modified lignosulfonate solutions as extenders does lengthen these stages of cure in all cases (see Table II—Examples 1, 2 & 3). When examining the results as shown in Example 6, one can readily see that this improvement in stages of cure is not isolated to a single class of amines. The results indicated in Example 7 are included to show that improvements in stage of cure is not due to a pH change. All of the various amines used in the work have resulted in an increase in pH, but ammonia-modified lignosulfonate does not lengthen the stage of cure.

EXAMPLE 9

The following procedure was used to demonstrate resin efficiency:

A. Weigh three clean, numbered aluminum dishes and add 30 grams of sand to each dish.
B. Place the dishes in the oven for two hours at 150° C.
C. Remove dishes from the oven and place in the dessicator allowing them to cool to room temperature.
D. Reweigh the dishes to the nearest 0.0001 gms.
E. To these sand filled dishes, using a medicine dropper, add 4 grams of diluted resin which has been prepared by accurately diluting the resin to 15% solids. This material should cover as much surface of the sand as possible.
F. Reweight the dishes to determine the exact sample weights. Weigh rapidly to minimize loss by evaporation.
G. Place the dishes in the oven heated to a temperature of 220° C. and allow them to remain for 2 hours.
H. Remove samples from the oven and place them in the dessicator to cool.
I. After the dishes have come to room temperature reweigh to determine final weight.
J. The above should always be run on a standard minderal fiber resin as a reference.

Calculations:

$$\% \text{ Efficiency} = \frac{\text{Weight dried resin} \times 100}{\text{grams resin solids sample}}$$

Grams resin solids sample = wet weigh of sample X 15% resin solids

The results are shown in Table III.

TABLE III
EFFICIENCY TEST DATA

| Example | % Resin | % Extender | Efficiency | |
|---|---|---|---|---|
| — | 100 | 0 | 90.6 | Standard Phenolic |
| — | 60 | 40 | 88.0 | Commercial Ammonium Lignosulfonate |
| — | 50 | 50 | 84.2 | Commercial Sodium Lignosulfonate |
| — | 50 | 50 | 86.7 | Commercial Calcium Lignosulfonate |
| 2 | 60 | 40 | 93.3 | — |
| | 50 | 50 | 92.3 | — |
| | 40 | 60 | 88.1 | — |
| 1 | 50 | 50 | 88.4 | — |
| 3 | 50 | 50 | 85.6 | — |

For this test the standard phenolic resin was used in the study. Again, for comparative purposes, commercial salts of lignosulfonic acid were tested against variaous salts of modified lignosulfonate to establish efficiency numbers.

Table III shows the same trend as shown in the stage of cure study. The addition of salts of commercial lignosulfonate solutions reduces the efficiency of the standard phenolic insulation resin, but the use of salts of amine modified lignosulfonate as extenders have increased the degree of efficiency.

Since modifications of this invention will be apparent to one skilled in the art, it is intended that the invention be limited only by the scope of the appended claims.

I claim:

1. A resin binder composition comprising an aqueous solution of a phenol-formaldehyde resole resin and from about 40 to about 100% by weight based on phenol-formaldehyde resin solids of a water-soluble basic amine-modified lignosulfonate said modified lignosulfonate containing from about 2% to about 12% by weight of a water-soluble basic amine and from about 88 to about 98% by weight of a water-soluble lignosulfonate salt.

2. The binder of claim 1 wherein the amine is a primary amine.

3. The binder of claim 1 wherein the amine is a tertiary amine.

4. The binder of claim 1 wherein the amine-modified lignosulfonate is formed from an alkanol amine.

5. The binder of claim 1 wherein the amine-modified lignosulfonate is formed from amine still bottoms.

6. The binder of claim 1 wherein the amine is triethanol amine.

7. The binder of claim 1 wherein the amine is still bottoms from the production of triethanol amine.

8. The binder of claim 1 wherein the amine-modified lignosulfonate contains from about 4 to about 10% amine and from about 90 to about 96% lignosulfonate salt.

9. The binder of claim 1 which contains urea in addition to the phenol-formaldehyde and amine-modified lignosulfonate salt.

10. In the method of producing mineral fiber mats useful for insulation purposes wherein mineral fibers are formed, the fibers are contacted with a thermosettable phenol-formaldehyde resin binder, the resin coated fibers are formed into a mat and the resin binder is cured with heat, the improvement comprising employing as the binder an aqueous solution of a phenol-formaldehyde resole resin and from about 40 to about 100% by weight based on phenol-formaldehyde resin solids of a water-soluble basic amine-modified lignosulfonate said modified lignosulfonate containing from about 2% to about 12% by weight of a water-soluble basic amine and from about 88 to about 98% by weight of a water-soluble lignosulfonate salt.

11. The method of claim 10 wherein the amine is a primary amine.

12. The method of claim 10 wherein the amine is a tertiary amine.

13. The method of claim 10 wherein the amine is an amine still bottoms.

14. The method of claim 10 wherein the resin binder contains urea in addition to the phenol-formaldehyde and the amine-modified lignosulfonate.

15. A mineral fiber mat wherein the mineral fibers are bound by a binder comprising phenol-formaldehyde and from about 40% to about 100% by weight based on the phenol-formaldehyde of a basic amine-modified lignosulfonate said modified lignosulfonate containing from about 2% to about 12% by weight of a water-soluble basic amine and from about 88 to about 98% by weight of a water-soluble lignosulfonate salt.

* * * * *